US009681469B2

(12) United States Patent
Hino (10) Patent No.: US 9,681,469 B2
(45) Date of Patent: Jun. 13, 2017

(54) WIRELESS COMMUNICATION SYSTEM, WIRELESS COMMUNICATION METHOD, PORTABLE TERMINAL, INFORMATION PROCESSING APPARATUS, AND PROGRAM (75) Inventor: Isao Hino, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/425,933

(22) PCT Filed: Sep. 7, 2012

(86) PCT No.: PCT/JP2012/005687
§ 371 (c)(1),
(2), (4) Date: Mar. 4, 2015

(87) PCT Pub. No.: WO2014/037980
PCT Pub. Date: Mar. 13, 2014

(65) Prior Publication Data
US 2015/0264720 A1    Sep. 17, 2015

(51) Int. Cl.
*H04W 76/02*    (2009.01)
*H04W 12/00*    (2009.01)
(Continued)

(52) U.S. Cl.
CPC .......... *H04W 76/02* (2013.01); *H04W 12/00* (2013.01); *H04W 12/04* (2013.01);
(Continued)

(58) Field of Classification Search
CPC ...... H04W 76/02; H04W 12/00; H04W 12/04
See application file for complete search history.

(56) References Cited

U.S. PATENT DOCUMENTS 8,891,422 B2 * 11/2014 Shinohara ........... H04M 1/7253
370/310.2
2008/0086529 A1 * 4/2008 Lu ...................... H04L 63/101
709/204
(Continued)

FOREIGN PATENT DOCUMENTS

EP          2385480 A1    11/2011
JP       2005-175524 A      6/2005
(Continued)

OTHER PUBLICATIONS

Japanese Office Action for JP Application No. 2011-053864 mailed on Nov. 18, 2014 with English Translation.
(Continued)

*Primary Examiner* — Albert T Chou (57) ABSTRACT

A wireless communication system (1) includes: an information processing apparatus (100) including a wireless communication unit (102) that is connected up to a network (3) through an access point according to a predetermined connection condition to perform wireless communication, a generation unit (104) that generates a two-dimensional code in which information on the connection condition is recorded, and a presentation unit (106) that presents the two-dimensional code; and a portable terminal (200) including a wireless communication unit (202) that is connected up to the network (3) to perform wireless communication, a code reading unit (204) that reads the two-dimensional code, an acquisition unit (206) that analyzes the read two-dimensional code to acquire the information on the connection condition, and a communication control unit (208) that builds the access point of the information processing apparatus (100) based on the information on the connection condition and controls wireless communication between the wireless communication unit (202) and the information processing apparatus (100). The wireless communication
(Continued)

unit (102) of the information processing apparatus (100) connects up to the network (3) using the portable terminal (200) as the access point, and performs wireless communication according to the connection condition.

11 Claims, 8 Drawing Sheets

(51) Int. Cl.
    *H04W 12/04*     (2009.01)
    *H04W 84/12*     (2009.01)
    *G06F 17/30*     (2006.01)
    *H04W 88/04*     (2009.01)

(52) U.S. Cl.
    CPC ....... *G06F 17/30879* (2013.01); *H04W 84/12* (2013.01); *H04W 88/04* (2013.01)

(56) References Cited

U.S. PATENT DOCUMENTS

| | | | | |
|---|---|---|---|---|
| 2008/0147882 A1* | 6/2008 | Reif | ...................... | H04W 8/183 709/238 |
| 2010/0296455 A1* | 11/2010 | Nakajima | ............. | H04W 16/00 370/328 |
| 2012/0223132 A1 | 9/2012 | Lim | | |
| 2013/0016710 A1* | 1/2013 | Shinohara | ........... | H04M 1/7253 370/338 |

FOREIGN PATENT DOCUMENTS

| | | |
|---|---|---|
| JP | 2006-157814 A | 6/2006 |
| JP | 2006-157815 A | 6/2006 |
| JP | 2006-261938 A | 9/2006 |
| JP | 2007-215120 A | 8/2007 |
| JP | 2007-312179 A | 11/2007 |
| JP | 2009-135688 A | 6/2009 |
| JP | 2009-225060 A | 10/2009 |
| JP | 2009-267578 A | 11/2009 |
| JP | 2010-093386 A | 4/2010 |
| JP | 2010-124161 A | 6/2010 |
| JP | 2012-054743 A | 3/2012 |
| WO | 2009-090295 A1 | 7/2009 |
| WO | 2011/132761 A1 | 10/2011 |

OTHER PUBLICATIONS

English translation of the International Search Report for PCT Application No. PCT/JP2012/005687, mailed on Oct. 2, 2012.
Extended European Search Report for EP Application No. EP12884121.0 mailed on Mar. 23, 2016.

\* cited by examiner

WIRELESS COMMUNICATION SYSTEM, WIRELESS COMMUNICATION METHOD, PORTABLE TERMINAL, INFORMATION PROCESSING APPARATUS, AND PROGRAM

This application is a National Stage Entry of PCT/JP2012/005687 filed on Sep. 7, 2012, the contents of all of which are incorporated herein by reference, in their entirety.

TECHNICAL FIELD

The present invention relates to a wireless communication system, a wireless communication method, a portable terminal, an information processing apparatus, and a program.

BACKGROUND ART

In order to connect an information processing apparatus or the like through a wireless local area network (LAN), a user should perform a variety of setting in advance, and should have a certain degree of knowledge for the connection.

Patent Document 1 discloses an example of a system that facilitates setting between a wireless LAN terminal and a wireless LAN relay device. In the system disclosed in Patent Document 1, encryption systems capable of being handled by the terminal is transmitted to an access point, refinement is performed based on the transmitted encryption systems, an encryption key to be used is determined, and then transmitted to the terminal, and the terminal performs the setting. Further, the access point selects an encryption system based on a predetermined security policy, and sets the selected encryption system and the determined encryption key. In this way, the system disclosed in Patent Document 1 realizes a new addition of a terminal that uses the wireless LAN by a simple method while preventing leakage of data indicating the encryption key.

Patent Document 2 and Patent Document 3 disclose examples of a home communication device and a portable terminal in which setting of a wireless LAN of the portable terminal is automatically performed. The home communication device disclosed in Patent Document 2 or Patent Document 3 allows the portable terminal to read configuration information stored in the home communication device including a modem or a router, so that the portable terminal can automatically set the wireless LAN or an application such as Voice over Internet Protocol (VoIP). The home communication device is mounted with a quick response (QR) code where the configuration information is recorded, or displays the QR code on a display. The portable terminal reads the QR code using a QR code reader, and decodes the QR code to acquire the configuration information to perform the setting. In this way, after automatically performing the setting, the portable terminal may perform wireless LAN communication through the home communication device.

Further, Patent Document 4 discloses an example of a system that sets wireless LAN communication between a projector and a portable terminal. In the image display system disclosed in Patent Document 4, the projector converts connection information necessary for accessing the projector through a wireless LAN into a two-dimensional code, and projects the two-dimensional code. The portable terminal captures an image of the code, and performs the setting using the connection information obtained by analyzing the image, thereby enabling the wireless LAN communication between the projector and the portable terminal. Similarly, in a network projector system disclosed in Patent Document 5, a projector projects connection information to a screen, and a portable terminal captures an image of the connection information and performs communication setting based on the connection information obtained by analyzing the image, thereby enabling wireless communication.

RELATED DOCUMENT

Patent Document

[Patent Document 1] Japanese Unexamined Patent Publication No. 2005-175524
[Patent Document 2] Japanese Unexamined Patent Publication No. 2006-157814
[Patent Document 3] Japanese Unexamined Patent Publication No. 2006-157815
[Patent Document 4] Japanese Unexamined Patent Publication No. 2007-312179
[Patent Document 5] Japanese Unexamined Patent Publication No. 2009-267578

DISCLOSURE OF THE INVENTION

However, the technique disclosed in the above-mentioned Patent Document 1 has a problem in that both of the wireless LAN terminal and the wireless LAN relay device should employ the system, and in a device that does not employ the system, the user still should perform the setting in advance for use of the wireless LAN and still should have a certain degree of knowledge. Further, if the user selects wrong setting due to insufficient knowledge, the setting performed under the consideration of security may be missed, and thus, there is a possibility of being attacked by a malicious user.

In addition, the techniques disclosed in the above-mentioned Patent Documents 2 to 5 realize the wireless LAN communication between the portable terminal including the device that reads the QR code and the home communication device or the projector, but have difficulties in application to a personal computer (PC) that have no mechanism for reading the QR code.

An object of the invention is to provide a wireless communication system, a wireless communication method, a portable terminal, an information processing apparatus, and a program that solve difficulties in setting while maintaining security in wireless LAN communication which is the problem as described above.

According to an aspect of the invention, there is provided a wireless communication system including an information processing apparatus and a portable terminal that functions as an access point of the information processing apparatus. The information processing apparatus includes: a first wireless communication unit that is connected up to a network through the access point according to a predetermined connection condition to perform wireless communication; a generation unit that generates a two-dimensional code in which information on the connection condition is recorded; and a presentation unit that presents the generated two-dimensional code. The portable terminal includes: a second wireless communication unit that is connected up to the network to perform wireless communication; a code reading unit that reads the two-dimensional code presented by the information processing apparatus; an acquisition unit that analyzes the read two-dimensional code to acquire the information on the connection condition; and a communication control unit that builds a function as the access point of the information processing apparatus based on the acquired information on the connection condition, and controls wireless communication between the second wireless communication unit and the information processing apparatus. The first wireless communication unit of the information processing apparatus connects up to the network using the portable terminal as the access point, and performs wireless communication according to the connection condition.

According to another aspect of the invention, there is provided a portable terminal including: a wireless communication unit that is connected up to a network to perform wireless communication; a code reading unit that reads a two-dimensional code in which information on a predetermined connection condition for connecting an information processing apparatus up to the network in a wireless manner is recorded; an acquisition unit that analyzes the read two-dimensional code to acquire the information on the connection condition; and a communication control unit that builds a function as an access point of the information processing apparatus based on the acquired information on the connection condition, and controls wireless communication between the wireless communication unit and the information processing apparatus.

According to still another aspect of the invention, there is provided an information processing apparatus including: a generation unit that generates a two-dimensional code in which information on a predetermined connection condition for connection up to a network in a wireless manner is recorded; a presentation unit that presents the generated two-dimensional code; and a wireless communication unit that connects up to the network using a portable terminal as an access point according to the connection condition to perform wireless communication.

According to still another aspect of the invention, there is provided a first program that causes a computer to execute a procedure including: reading a two-dimensional code in which information on a predetermined connection condition for connecting an information processing apparatus up to a network in a wireless manner is recorded; analyzing the read two-dimensional code to acquire the information on the connection condition; and building a function as an access point of the information processing apparatus based on the acquired information on the connection condition, performing the connection to the network, and controlling wireless communication with the information processing apparatus.

According to still another aspect of the invention, there is provided a second program that causes a computer to execute a procedure including: generating a two-dimensional code in which information on a predetermined condition for connection up to a network in a wireless manner is recorded; presenting the generated two-dimensional code; and connecting up to the network using a portable terminal as an access point according to the connection condition to perform wireless communication.

According to still another aspect of the invention, there is provided a wireless communication method including: generating, by an information processing apparatus, a two-dimensional code in which information on a predetermined connection condition for connection up to a network in a wireless manner is recorded; presenting, by the information processing apparatus, the generated two-dimensional code; reading, by a portable terminal, the two-dimensional code presented by the information processing apparatus; analyzing, by the portable terminal, the read two-dimensional code to acquire the information on the connection condition; building, by the portable terminal, a function as an access point of the information processing apparatus based on the acquired information on the connection condition; and connecting, by the information processing apparatus, up to the network using the portable terminal as the access point to perform wireless communication.

An arbitrary combination of the above components, and a technique for converting the representations of the invention between a method, an apparatus, a system, a recording medium, a computer program, and the like are effective as aspects of the invention.

Further, the various components of the invention may not only be configured so that the components are independently provided, but may also be configured so that plural components are formed as a single member, so that a single component is provided as plural members, so that a certain component is provided as apart of another component, or so that a part of a certain component overlaps with a part of another component, for example.

In addition, in the method and the computer programs of the invention, the plural procedures are arranged in order, but the arrangement order does not limit an execution order of the plural procedures. Thus, when the method and the computer programs of the invention are executed, the order of the plural procedures may be modified in a range without departing from the spirit of the invention.

In addition, the plural procedures of the method and the computer programs of the invention may or may not be executed at individually different times. Thus, if a certain procedure occurs while another procedure is being executed, execution times of both the procedures may partially or entirely overlap with each other, for example.

According to the invention, it is possible to provide a wireless communication system, a wireless communication method, a portable terminal, an information processing apparatus, and a program capable of easily performing setting while maintaining security in wireless LAN communication.

BRIEF DESCRIPTION OF THE DRAWINGS

The above-described objects, other objects, features and advantages will become apparent by preferred exemplary embodiments and the accompanying drawings to be described hereinafter.

DESCRIPTION OF EXEMPLARY EMBODIMENTS

Figure 1:
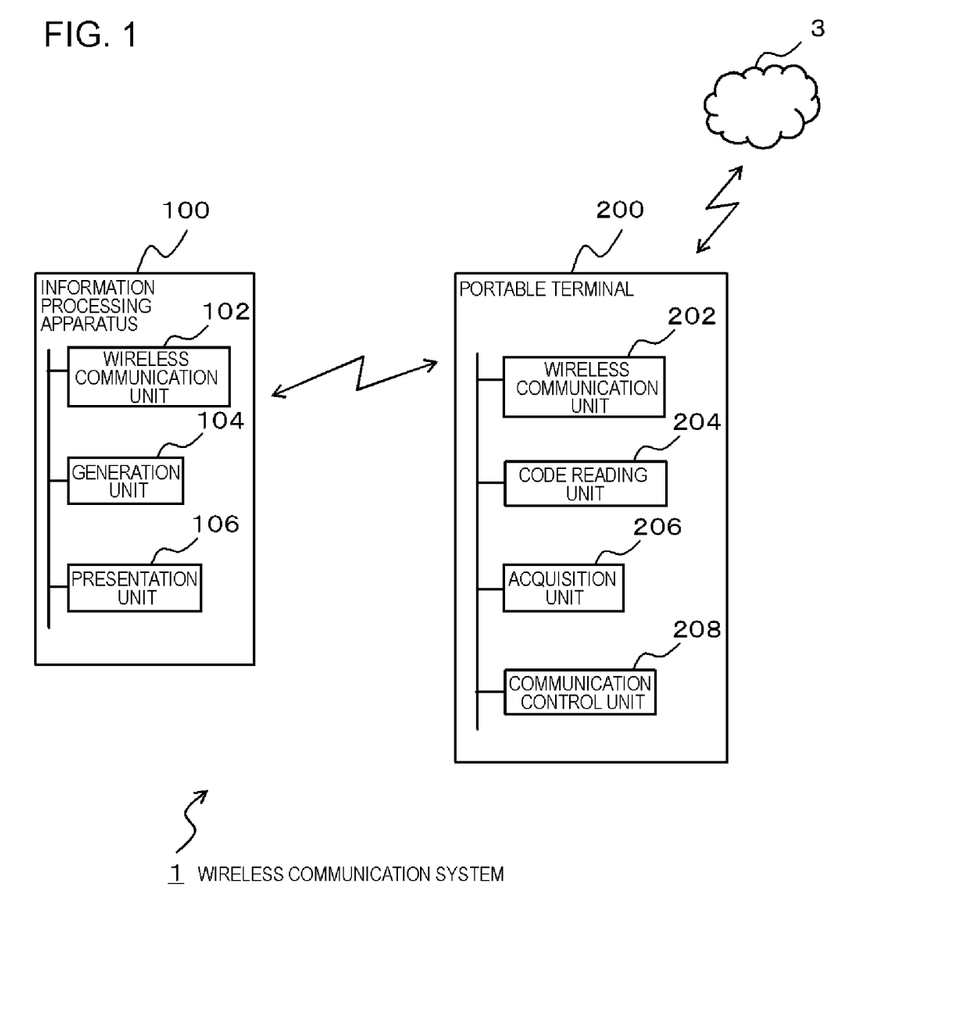
FIG. 1 is a functional block diagram illustrating a configuration of a wireless communication system according to an exemplary embodiment of the invention.

Hereinafter, exemplary embodiments of the invention will be described with reference to the accompanying drawings. The same reference numerals are given to the same components, and description will not be repeated.
(First Exemplary Embodiment)
FIG. 1 is a functional block diagram illustrating a configuration of a wireless communication system 1 according to an exemplary embodiment of the invention.

The wireless communication system 1 according to the present exemplary embodiment includes an information processing apparatus 100, and a portable terminal 200 that functions as an access point of the information processing apparatus 100.

In the wireless communication system 1 of the present exemplary embodiment, the information processing apparatus 100 that includes a wireless local area network (LAN) communication interface is connected up to a network 3 such as a LAN or the Internet through the portable terminal 200 that functions as the access point.

In the present exemplary embodiment, the information processing apparatus 100 is connected up to the network 3 through the access point according to a predetermined connection condition, and includes a wireless communication unit 102 that performs wireless communication, a generation unit 104 that generates a two-dimensional code on which information on the connection condition is recorded, and a presentation unit 106 that presents the generated two-dimensional code.

The portable terminal 200 includes a wireless communication unit 202 that is connected up to the network 3 and performs wireless communication, a code reading unit 204 that reads the two-dimensional code presented by the information processing apparatus 100, an acquisition unit 206 that analyzes the read two-dimensional code to acquire the information on the connection condition, and a communication control unit 208 that builds the function as the access point of the information processing apparatus 100 based on the acquired information on the connection condition and controls wireless communication between the wireless communication unit 202 and the information processing apparatus 100.

Further, the wireless communication unit 102 of the information processing apparatus 100 connects up to the network 3 using the portable terminal 200 as the access point, and performs wireless communication according to the connection condition.

Figure 2:
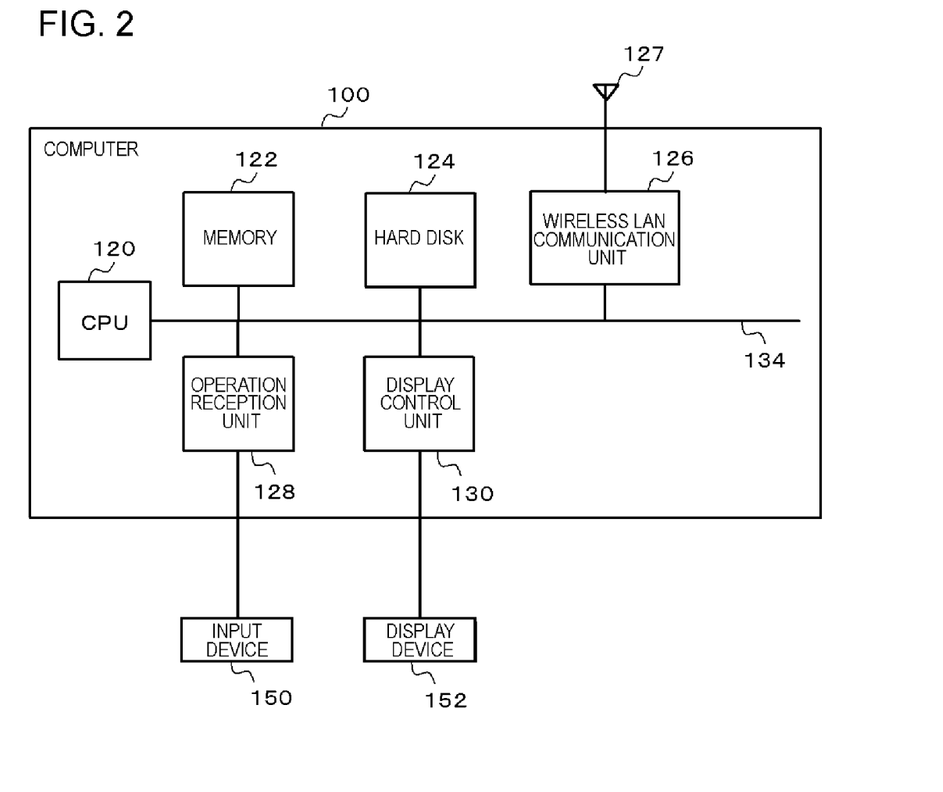
FIG. 2 is a block diagram illustrating a configuration of a computer that realizes an information processing apparatus of the wireless communication system according to the exemplary embodiment of the invention shown in FIG. 1.

As shown in FIG. 2, the information processing apparatus 100 may be realized using a server computer, a personal computer (PC), or a device corresponding thereto, that includes a central processing unit (CPU) 120, a memory 122, a hard disk 124, and a communication device (an antenna 127 and a wireless LAN communication unit 126), and is connected to an input device 150 such as a keyboard or a mouse, a display device 152 such as a display, or an output device (not shown) such as a printer. The information processing apparatus 100 further includes an operation reception unit 128 that receives an input of the input device 150, and a display control unit 130 that controls display of the display device 152.

The respective components of the information processing apparatus 100 are connected to each other through a bus 134. The CPU 120 controls the entirety of the information processing apparatus 100 together with the respective components connected through the bus 134. The CPU 120 causes a program stored in the hard disk 124 to be read into the memory 122 and to be executed, thereby realizing respective functions of the respective units of the information processing apparatus 100 in FIG. 1. In the respective figures, configurations of portions that are not related to the spirit of the invention are not shown.

A computer program of the information processing apparatus 100 of the present exemplary embodiment may be recorded on a computer-readable recording medium. The recording medium is not particularly limited, and various types may be considered. Further, the program may be loaded to the memory 122 (FIG. 2) of the computer (information processing apparatus 100) from the recording medium, or may be downloaded to the computer (information processing apparatus 100) through the network 3 connected by a wired LAN to then be loaded to the memory 122.

Returning to FIG. 1, in the information processing apparatus 100, the wireless communication unit 102 performs wireless LAN communication, for example, communication based on a standard such as Institute of Electrical and Electronic Engineers (IEEE) 802.11b, IEEE802.11a or IEEE 802.11g, with the portable terminal 200 according to the predetermined connection condition using the antenna 127 and the wireless LAN communication unit 126 shown in FIG. 2, and connects up to the network 3 using the portable terminal 200 as the access point to perform wireless communication.

The predetermined connection condition includes various setting items for connection of the information processing apparatus 100 up to the network 3 in a wireless manner. For example, the predetermined connection condition includes a wireless communication connection type, and a security level, for example, the necessity, type or the like of encryption, which may beset in advance according to the security policy of the user.

The connection type may be set by selection of a wireless LAN standard such as Wi-Fi Protected Access (WPA) or Wi-Fi Protected Access Pre-Shared Key (WPA-PSK), for example, or may be set in a state where the connection type is not specified.

Further, the necessity of encryption may be set, and an encryption system such as Wired Equivalent Privacy (WEP) or Advanced Encryption Standard (AES) may be selected and set. In addition, an encryption key in encryption processing may be also set. Furthermore, a standard of wireless LAN communication to be used may be set.

In the present exemplary embodiment, the connection condition may be set in advance, for example, may be provided together with the above-mentioned program as a setting file, which is installed in the information processing apparatus 100 to be stored in the hard disk 124. In this case, plural setting files according to different connection conditions may be included in advance. Further, a setting file may be selected from the plural setting files in accordance with the user's need, so that setting suitable for a condition desired by the user may be performed.

The setting file may be recorded on various recording mediums, for example, a compact disc (CD) or a digital versatile disk (DVD) together with the program as described above to be provided to the user, or may be downloaded from a predetermined site to be acquired by the user.

In the invention, since information on a portion relating to secret information is generated by the generation unit 104 (to be described later) for every connection, the setting file itself in which the connection condition is recorded can maintain the security even when the setting file is acquired through various routes.

The generation unit 104 generates the two-dimensional code in which the information on the above-mentioned predetermined connection condition is recorded, and allows the presentation unit 106 to present the two-dimensional code. As the two-dimensional code, for example, a QR code, a Data Matrix code, a MaxiCode barcode, a stacked two-dimensional code or the like may be considered, which is not particularly limited. Hereinafter, in the present exemplary embodiment, the two-dimensional code will be described as the QR code.

In the present exemplary embodiment, the generation unit 104 uses, as a trigger to perform processing, the time when the computer program according to the exemplary embodiment of the invention starts or when an operation of the wireless LAN setting or connection request is received after the program starts. Further, when the setting for performing the encryption processing under the connection condition is performed, the generation unit 104 may generate a password, and may include the password in the QR code. It is preferable that the password be randomly generated using random numbers or the like.

The presentation unit 106 presents the QR code generated by the generation unit 104. In the present exemplary embodiment, the presentation unit 106 displays the QR code on a display screen such as the display device 152 shown in FIG. 2 or the like to present the QR code to the user. In another exemplary embodiment, for example, a configuration in which the QR code is printed on a printed material using an output device such as a printer connected to the information processing apparatus 100 may be used.

Figure 3:
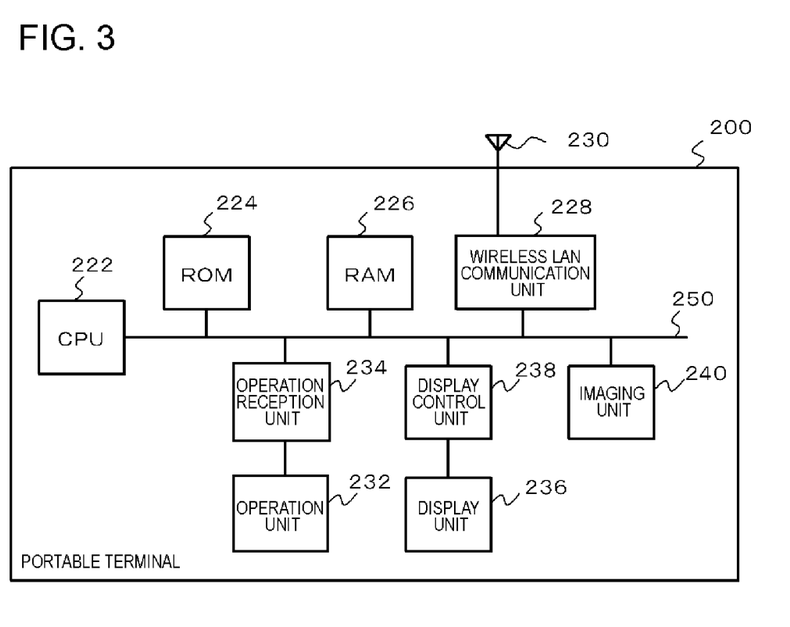
FIG. 3 is a block diagram illustrating a configuration of a portable terminal of the wireless communication system according to the exemplary embodiment of the invention shown in FIG. 1.

Further, as shown in FIG. 3, the portable terminal 200 includes a CPU 222, a read only memory (ROM) 224, a random access memory (RAM) 226, a wireless LAN communication unit 228, an antenna 230, an operation unit 232, an operation reception unit 234, a display unit 236, a display control unit 238, and an image capturing unit 240.

The portable terminal 200 is a portable communication terminal capable of being connected up to the network 3 (FIG. 1) using a wireless LAN through a base station (not shown), and includes the image capturing unit 240. The portable terminal 200 may be a cellular phone, a personal handy-phone system (PHS), a personal digital assistance (PDA), a game machine or the like.

The CPU 222 is connected to the respective components of the portable terminal 200 through a bus 250, and controls the entirety of the portable terminal 200 together with the respective components. The ROM 224 stores a basic program for operating the portable terminal 200 or an application program, a variety of setting data to be used when these programs are operated, a variety of contents capable of being used by the portable terminal 200, or the like. The RAM 226 has a work area for operating the program. The CPU 222 causes the program stored in the ROM 224 to be read into the RAM 226 to be executed, thereby realizing various functions of the respective units of the portable terminal 200 shown in FIG. 1.

The operation unit 232 includes operation keys, operation buttons, a switch, a jog dial, a touch pad, a touch panel, or the like. The operation reception unit 234 receives an operation of a user through the operation unit 232, and notifies the CPU 222 of the result. The display unit 236 includes a light emitting diode (LED) display, a liquid crystal display, an organic electroluminescence (EL) display, or the like. The display control unit 238 performs various screen displays on the display unit 236 according to instructions from the CPU 222.

The image capturing unit 240 is a digital camera that uses an element such as a charge coupled devices (CCD) image sensor or a complementary metal oxide semiconductor (CMOS) image device.

Further, the portable terminal 200 may include a speaker or a microphone, a sound input and output control unit, and a vibration functional unit (not shown).

Returning to FIG. 1, in the portable terminal 200, the wireless communication unit 202 builds the function as the access point for being connected up to the network 3 according to the predetermined connection condition. In addition, the wireless communication unit 202 makes the information processing apparatus 100 connect up to the network 3 through itself using the antenna 230 and the wireless LAN communication unit 228 shown in FIG. 3 and perform wireless communication. The wireless LAN communication with the information processing apparatus 100 and the wireless LAN communication with the base station (not shown) of the network 3 may be performed based on the standard such as IEEE802.11b, IEEE802.11a or IEEE802.11g. The standard to be used may be determined according to the information recorded in the QR code.

The code reading unit 204 reads the QR code presented by the information processing apparatus 100 using the image capturing unit 240 shown in FIG. 3. As a process of reading the QR code, general reading processing of the QR code of the portable terminal may be used as it is. That is, an image of the QR code being shot by the image capturing unit 240 of the portable terminal 200 may be displayed on the display unit 236 (FIG. 2). Then, the user may perform an operation of releasing a shutter using the operation unit 232 (FIG. 2) to capture an image of the QR code, thereby acquiring a picture of the QR code. The code reading unit 204 may read the QR code using an image scanner (not shown) provided in the portable terminal 200 instead of the image capturing unit 240.

The acquisition unit 206 analyzes the read QR code, and determines whether the information on the wireless LAN communication connection condition is included therein. If the information on the connection condition is included, the information of the connection condition is acquired and then transmitted to the communication control unit 208. If the information on the connection condition is not included, general recognition processing of the QR code is performed.

The communication control unit 208 performs setting for allowing itself to function as the access point of the information processing apparatus 100 based on the information on the connection condition acquired by the acquisition unit 206 to build the access point. After the function as the access point is built, the communication control unit 208 controls the wireless communication between the wireless communication unit 202 and the information processing apparatus 100 and between the wireless communication unit 202 and the network 3.

In the present exemplary embodiment, the information processing apparatus 100 and the portable terminal 200 performs communication in an ad hoc mode in which one-to-one communication is performed.

As described above, the respective components of the information processing apparatus 100 and the portable terminal 200 of the wireless communication system 1 of the present exemplary embodiment may be realized by combining hardware and software using an arbitrary computer including, as main components, a CPU, a memory, a program for realizing components as shown in the present figures loaded to the memory, a storage unit such as a hard disk that stores the program, and a network connection interface. In addition, those skilled in the art will understand that there are various realization methods and apparatuses. The respective figures described herein do not show configurations of a hardware unit, but show blocks of a functional unit.

Further, in the respective figures, configurations of the portions that are not related to the spirit of the invention are not shown.

The computer program according to the exemplary embodiment of the invention is configured to allow a computer for realizing the information processing apparatus 100 to execute a procedure for generating the two-dimensional code (QR code) in which the information on the predetermined connection condition for connection up to the network 3 in a wireless manner is recorded, a procedure for presenting the generated QR code, and a procedure for connecting up to the network 3 using the portable terminal 200 as the access point according to the connection condition to perform wireless communication.

Further, the computer program according to the exemplary embodiment of the invention is configured to allow a computer for realizing the portable terminal 200 to execute a procedure for reading the two-dimensional code (QR code) in which the information on the predetermined connection condition for connecting the information processing apparatus 100 up to the network 3 in a wireless manner is recorded, a procedure for analyzing the read QR code to acquire the information on the connection condition, and a procedure for building the function as the access point of the information processing apparatus 100 based on the acquired information on the connection condition, connecting up to the network 3, and controlling wireless communication with the information processing apparatus 100.

The computer program of the present exemplary embodiment may be recorded on a computer-readable recording medium. The recording medium is not particularly limited, and various types may be considered. In addition, the program may be loaded to the memory of the computer from the recording medium, or may be downloaded to the computer through the network to then be loaded to the memory.

Figure 4:
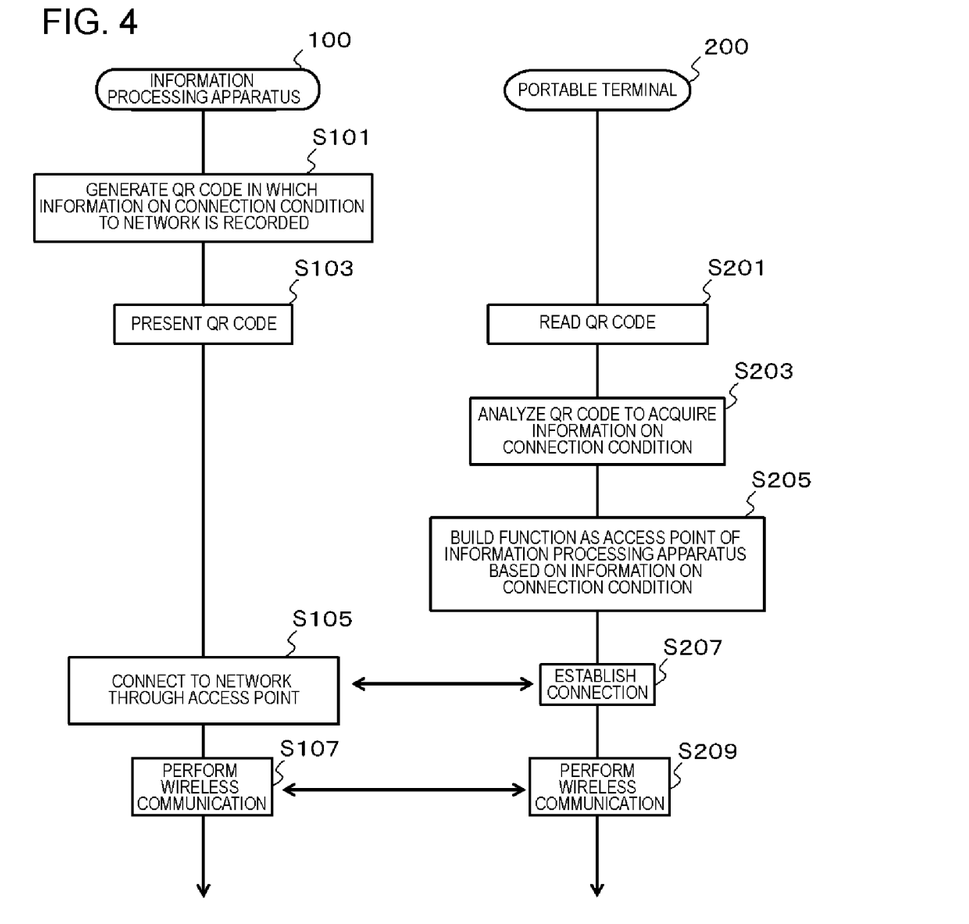
FIG. 4 is a flowchart illustrating an example of an operation of a wireless communication system according to an exemplary embodiment of the invention.

In the above-described configuration, a wireless communication method in the wireless communication system 1 of the present exemplary embodiment will be described hereinafter. FIG. 4 is a flowchart illustrating an example of an operation of the wireless communication system 1 of the present exemplary embodiment. Hereinafter, the description will be made with reference to FIGS. 1 and 4.

In the wireless communication method of the present exemplary embodiment, the generation unit 104 (FIG. 1) of the information processing apparatus 100 generates the two-dimensional code (QR code) in which the information on the predetermined connection condition for connection up to the network 3 (FIG. 1) in a wireless manner is recorded (step S101). Then, the presentation unit 106 of the information processing apparatus 100 presents the generated QR code (step S103). Then, the code reading unit 204 (FIG. 1) of the portable terminal 200 reads the QR code presented by the information processing apparatus 100 (step S201). Then, the acquisition unit 206 (FIG. 1) of the portable terminal 200 analyzes the read QR code to acquire the information on the connection condition (step S203). Then, the communication control unit 208 (FIG. 1) of the portable terminal 200 builds the function as the access point of the information processing apparatus 100 based on the acquired information on the connection condition (step S205). Then, the wireless communication unit 102 (FIG. 1) of the information processing apparatus 100 connects up to the network 3 using the portable terminal 200 as the access point (step S105 and step S207), and performs wireless communication (step S107 and step S209). Thereafter, the information processing apparatus 100 may connect up to the network 3 using the portable terminal 200 as the access point according to the predetermined connection condition to perform wireless communication.

As described above, according to the wireless communication system 1 according to the exemplary embodiment of the invention, since the information for the wireless LAN connection is recorded in the QR code generated by the information processing apparatus 100, by simply reading the QR code by the portable terminal 200, it is possible to easily perform the setting while maintaining the security in the wireless LAN communication. Since the pre-setting for performing the wireless LAN communication is not necessary, the user can use the wireless LAN communication without any knowledge relating to the wireless LAN communication. In this way, the portable terminal 200 can easily function as the access point, and the information processing apparatus 100 can be safely connected up to the network 3 using wireless communication under an appropriate connection condition.

Further, since the portable terminal 200 can function as the access point for connection up to the network 3, compared with wireless LAN communication through an installation router or a modem, complication of wiring is reduced and it can be used regardless of the place, thereby enhancing usability. Particularly, when the information processing apparatus 100 is a portable PC or the like, the information processing apparatus 100 together with the portable terminal 200 can be freely moved anywhere, the wireless communication can be used regardless of the place, thereby enhancing the convenience. Further, security suitable for a security level desired by the user can be maintained without complicated setting.

(Second Exemplary Embodiment)

Figure 5:
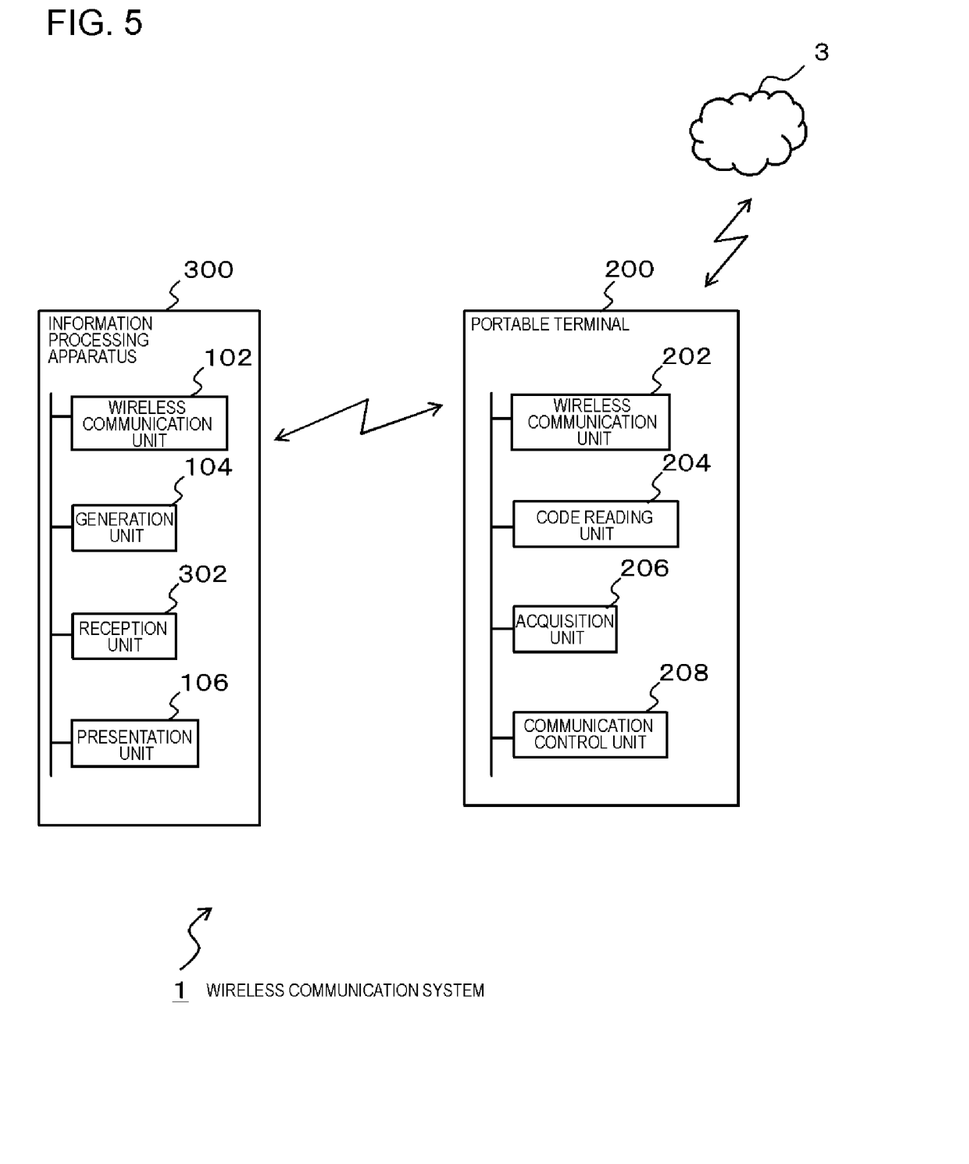
FIG. 5 is a functional block diagram illustrating a configuration of a wireless communication system according to an exemplary embodiment of the invention.

FIG. 5 is a functional block diagram illustrating a configuration of a wireless communication system 1 according to an exemplary embodiment of the invention.

The wireless communication system 1 of the present exemplary embodiment is different from the above described exemplary embodiment in that a user can freely select a connection condition.

As shown in FIG. 5, the wireless communication system 1 includes an information processing apparatus 300, and the same portable terminal 200 as in the above described exemplary embodiment. The information processing apparatus 300 includes the wireless communication unit 102, the generation unit 104, and the presentation unit 106, similar to the information processing apparatus 100 of the above described exemplary embodiment, and further includes a reception unit 302. Further, the information processing apparatus 300 has the same configuration as the computer of the above described exemplary embodiment shown in FIG. 2.

The reception unit 302 receives setting of a connection condition from a user. The setting received by the reception unit 302 is stored in a setting file, and is used when the generation unit 104 generates a QR code. The reception unit 302 includes the operation reception unit 128 and the display control unit 130, shown in FIG. 2. The setting file is stored in the memory 122 or the hard disk 124 shown in FIG. 2.

Figure 6:
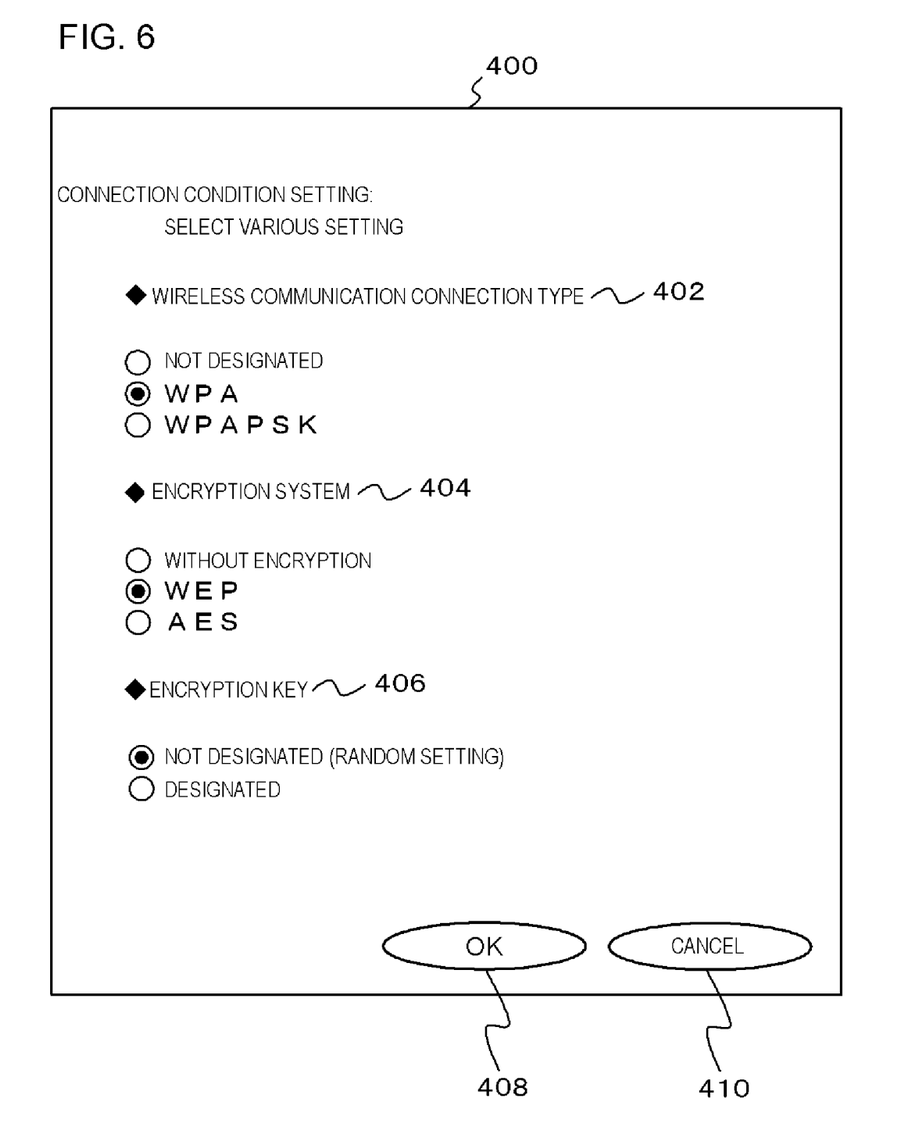
FIG. 6 is a diagram illustrating an example of a setting screen of a wireless communication system according to an exemplary embodiment of the invention.

In the present exemplary embodiment, the information processing apparatus 300 allows the display device 152 shown in FIG. 2 to display a setting screen 400 as shown in FIG. 6, and prompts a user to perform the setting operation. The user may perform the setting on the setting screen 400 using the input device 150 shown in FIG. 2. If the user performs the setting according to the setting screen 400, the reception unit 302 receives the connection condition set on the setting screen 400 by the user.

As shown in FIG. 6, for example, the setting screen 400 includes a connection type setting section 402, an encryption system setting section 404, and an encryption key setting section 406, and the user may perform various settings in the respective sections.

When the user designates a password to be used as an encryption key, an entry field (not shown) such as a text box for password input or an entry field for confirmation is displayed in the encryption key setting section 406.

Further, the reception unit 302 may allow the user to select a security level desired by the user in advance from broad levels of high, medium and low, or to select the place where the user uses the program, for example, a home, a public facility, an office or the like so that the user can reliably select the setting without hesitation, and may then receive the setting. A configuration may be used in which a default connection condition suitable for the security level or the service place received by the reception unit 302 is automatically set to be stored in a setting file and the setting file to be used is selected.

In addition, on the setting screen 400, a state where the default setting is selected in advance may be displayed. The setting screen 400 further includes an OK button 408 and a cancel button 410. When the reception unit 302 receives an operation of the OK button 408, the reception unit 302 receives the setting selected on the setting screen 400 to store the received setting in the setting file or to update the setting file. When receiving an operation of the cancel button 410, the reception unit 302 does not update the setting file and finishes the setting operation.

When the program is operated in the information processing apparatus 300, the setting screen 400 may be configured to be constantly displayed, or to be displayed when receiving an operation of a menu, an icon or the like.

In the present exemplary embodiment, when updating the setting file, the reception unit 302 notifies the generation unit 104 of the result. The generation unit 104 receives the notification, and generates a QR code according to the setting of the setting file.

The update processing of the setting file of the wireless communication system 1 of the present exemplary embodiment as thus constructed will be described hereinafter.

In the present exemplary embodiment, the portable terminal 200 is operated in the same procedure as the procedure of the above described exemplary embodiment shown in FIG. 4. The information processing apparatus 300 is operated in the same procedure as the procedure of the above described exemplary embodiment shown in FIG. 4, and further executes steps S131 to S135 in FIG. 7 before step S101 in FIG. 4. Hereinafter, the description will be made using FIG. 2, and FIGS. 5 to 7.

Figure 7:
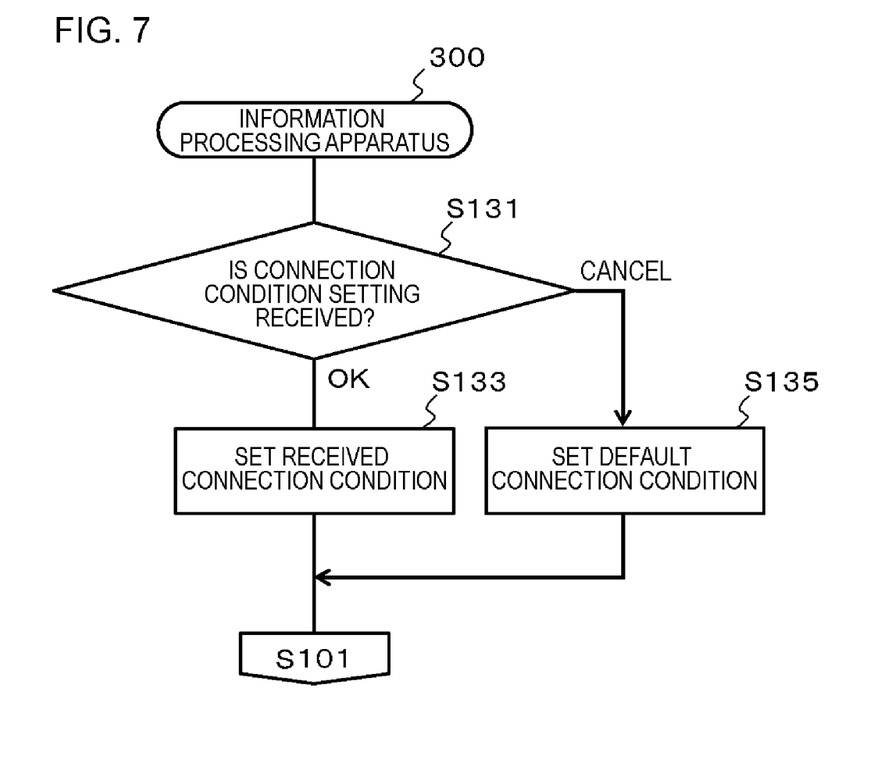
FIG. 7 is a flowchart illustrating an example of a procedure of updating processing of a setting file of an information processing apparatus of a wireless communication system according to an exemplary embodiment of the invention.

First, after the user sets the connection condition on the setting screen 400 (FIG. 6) displayed on the display device 152 (FIG. 2) of the information processing apparatus 300, if the reception unit 302 (FIG. 5) of the information processing apparatus 300 receives the operation of the OK button 408 (FIG. 6) (OK in step S131 in FIG. 7), the reception unit 302 stores the received connection condition in the setting file (step S133 in FIG. 7). Then, the reception unit 302 notifies the generation unit 104 (FIG. 5) of the information processing apparatus 300 of a generation of the QR code, and then, the procedure proceeds to step S101 in FIG. 4.

On the other hand, when the reception unit 302 receives the operation of the cancel button 410 (FIG. 6) on the setting screen 400 (CANCEL in step S131 in FIG. 7), since the reception unit 302 does not update the setting file, the generation unit 104 is permitted to use the default setting file (step S135 in FIG. 7). Further, the reception unit 302 notifies the generation unit 104 of a generation of the QR code, and then, the procedure proceeds to step S101 in FIG. 4.

As described above, according to the wireless communication system 1 of the present exemplary embodiment, the same effect as in the above described exemplary embodiment can be achieved, and a setting change of the connection condition can be performed by a simple operation according to a security policy of each user or a use scene of the wireless LAN, thereby enhancing usability. Further, since a user who has a certain degree of knowledge relating to the wireless LAN communication can also perform desired setting, it is possible to satisfy various users' needs.

(Third Exemplary Embodiment)

Figure 8:
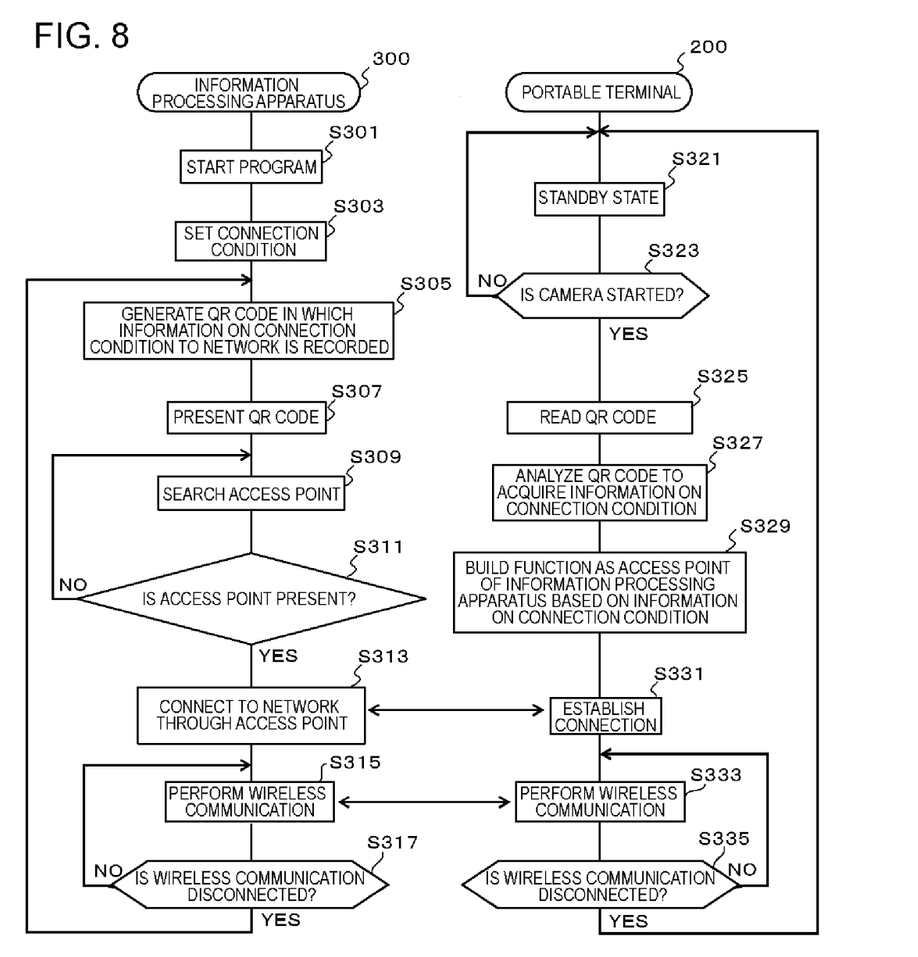
FIG. 8 is a flowchart illustrating an example of a wireless communication system according to an exemplary embodiment of the invention.

FIG. 8 is a flowchart illustrating an example of a wireless communication system 1 according to an exemplary embodiment of the invention.

The wireless communication system 1 of the present exemplary embodiment includes the information processing apparatus 300, and the portable terminal 200, similar to the above described exemplary embodiment shown in FIG. 5. The wireless communication system 1 may be configured to also include the information processing apparatus 100 and the portable terminal 200, similar to the above described exemplary embodiment shown in FIG. 1. Hereinafter, the description will be made with reference to FIGS. 1 to 3, FIG. 5, FIGS. 6 and 8.

The wireless communication system 1 (FIG. 5) of the present exemplary embodiment is approximately operated as follows.

In the wireless communication system 1 of the present exemplary embodiment, after the generation unit 104 (FIG. 5) of the information processing apparatus 300 generates the QR code (step S305 in FIG. 8), the wireless communication unit 102 (FIG. 5) of the information processing apparatus 300 starts an access point search (step S309 in FIG. 8). Then, the wireless communication unit 102 of the information processing apparatus 300 establishes wireless communication with the portable terminal 200 (FIG. 5) in which the function as the access point is built (step S313 in FIG. 8). Each time when the wireless communication with the portable terminal 200 is disconnected (YES in step S317 in FIG. 8), the wireless communication unit 102 of the information processing apparatus 300 allows the generation unit 104 of the information processing apparatus 300 to generate a new password to be included in the information to be recorded in the QR code to thereby generate a new QR code (step S305 in FIG. 8), and then, starts the access point search again (step S309 in FIG. 8). In addition, the wireless communication unit 102 of the information processing apparatus 300 establishes the wireless communication with the portable terminal 200 in which the function as the access point is built (step S313 in FIG. 8).

Specifically, first, in the information processing apparatus 300, the program relating to the exemplary embodiment of the invention is started (step S301 in FIG. 8). Further, the reception unit 302 (FIG. 5) of the information processing apparatus 300 displays the setting screen 400 (FIG. 6) on the display device 152 (FIG. 2) of the information processing apparatus 300 to prompt the user to perform the operation, receives the setting of the connection condition, and stores the result in the setting file (step S303 in FIG. 8). As described above, the connection condition set in advance may be used. When the setting file is determined in advance, step S301 in FIG. 8 may not be performed. Further, the processing of step S303 in FIG. 8 may be executed according to a setting change request of the user.

Then, the generation unit 104 (FIG. 5) of the information processing apparatus 300 generates the QR code according to the setting file set in step S303 in FIG. 8 (step S305 in FIG. 8). Then, the presentation unit 106 (FIG. 5) of the information processing apparatus 300 displays the QR code on the display device 152 (FIG. 2) (step S307 in FIG. 8).

Meanwhile, it is assumed that the portable terminal 200 is initially in a standby state (step S321 in FIG. 8). Then, the user operates the operation unit 232 (FIG. 3) of the portable terminal 200 to operate the camera of the image capturing unit 240 (FIG. 3) of the portable terminal 200 (Yes in step S323 in FIG. 8).

If the user releases the shutter to capture an image of the QR code displayed on the display device 152 by the information processing apparatus 300, the code reading unit 204 (FIG. 5) of the portable terminal 200 reads the image-captured QR code (step S325 in FIG. 8).

Furthermore, the acquisition unit 206 (FIG. 5) of the portable terminal 200 analyzes the QR code to acquire the information on the connection condition (step S327 in FIG. 8).

Meanwhile, in the information processing apparatus 300, the wireless communication unit 102 (FIG. 5) searches for an access point capable of being accessed by itself (step S309 in FIG. 8). For example, a message, an icon or the like for notifying the user that "the access point is now being searched" may be screen-displayed on the display device 152 of the information processing apparatus 300.

The communication control unit 208 (FIG. 5) of the portable terminal 200 builds the function as the access point of the information processing apparatus 300 based on the information on the connection condition acquired by the acquisition unit 206 of the portable terminal 200 (step S329 in FIG. 8).

Then, the wireless communication unit 102 of the information processing apparatus 300 that searches the access point finds the portable terminal 200 (YES in step S311 in FIG. 8), accesses the portable terminal 200, and makes a request of connection to the network 3 (FIG. 1) (step S313 in FIG. 8). The communication control unit 208 (FIG. 5) of the portable terminal 200 establishes connection with the information processing apparatus 300, and establishes connection to the network 3 (step S331 in FIG. 8).

Then, the wireless communication between the wireless communication unit 102 of the information processing apparatus 300 and the wireless communication unit 202 (FIG. 5) of the portable terminal 200, and the wireless communication between the wireless communication unit 202 of the portable terminal 200 and the network 3 are respectively performed (step S315 in FIG. 8 and step S333 in FIG. 8).

Then, when the wireless communication between the information processing apparatus 300 and the portable terminal 200 is disconnected (YES in step S317 in FIG. 8), in the information processing apparatus 300, the procedure returns to step S305 in FIG. 8. In step S305 in FIG. 8, the generation unit 104 of the information processing apparatus 300 generates a new password, generates a QR code including information on the generated new password again, and transmits the result to the presentation unit 106 of the information processing apparatus 300.

On the other hand, when the wireless communication between the information processing apparatus 300 and the portable terminal 200 is disconnected (YES in step S335 in FIG. 8), in the portable terminal 200, the procedure returns to step S321 in FIG. 8 so that the portable terminal 200 enters the standby state. Further, the portable terminal 200 waits for the startup of the camera of the image capturing unit 240 (step S323 in FIG. 8), and reads the QR code newly presented by the information processing apparatus 300.

That is, in the wireless communication system 1 of the present exemplary embodiment, when the wireless communication between the information processing apparatus 300 and the portable terminal 200 is established and then disconnected, the generation unit 104 of the information processing apparatus 300 generates a new password and generates a QR code including information on the generated QR code. Then, the presentation unit 106 presents the QR code, and the code reading unit 204 of the portable terminal 200 reads the QR code. Then, the communication control unit 208 attempts connection again.

As described above, according to the wireless communication system 1 of the present exemplary embodiment, the same effect as in the above described exemplary embodiments can be achieved. Further, since when the wireless communication is disconnected, a new password is generated for every connection to restart the wireless connection, the security is enhanced.

While the invention has been particularly shown and described with reference to exemplary embodiments and examples thereof, the invention is not limited to these exemplary embodiments and examples. It will be understood by those of ordinary skill in the art that various changes in form and details may be made therein without departing from the spirit and scope of the present invention as defined by the claims.

What is claimed is:

1. A wireless communication system comprising:
an information processing apparatus; and
a portable terminal,
wherein the information processing apparatus comprises:
  a first wireless communication unit that is connected to a network through an access point according to a predetermined connection condition to perform wireless communication,
  a generation unit that generates a two-dimensional code in which information on the connection condition is recorded, the connection condition comprising a setting necessary to have the information processing apparatus connect to the network, and the setting comprising at least one of a wireless communication connection type, a security level, and a wireless LAN standard, and
  a presentation unit that presents the generated two-dimensional code,
wherein the portable terminal comprises
a second wireless communication unit that is connected to the network to perform wireless communication,
a code reading unit that reads the two-dimensional code presented by the information processing apparatus,
an acquisition unit that analyzes the read two-dimensional code to acquire the information on the connection condition, and a communication control unit that builds a function as the access point of the information processing apparatus based on the acquired information on the connection condition, and controls wireless communication between the second wireless communication unit and the information processing apparatus, and the first wireless communication unit of the information processing apparatus connects to the network by way of the portable terminal functioning as the access point, and performs wireless communication according to the connection condition, wherein the first wireless communication unit of the information processing apparatus starts, after the generation unit of the information processing apparatus generates the two-dimensional code, searching for the access point, and establishes wireless communication with the portable terminal in which the function as the access point is built, and the first wireless communication unit of the information processing apparatus is configured to, in response to wireless communication with the portable terminal being disconnected, control the generation unit of the information processing apparatus to generate a new password to be used for encryption processing, to include a result in the information recorded in the two-dimensional code to generate a new two-dimensional code, to start searching for the access point again, and to establish wireless communication with the portable terminal in which the function as the access point is built.

2. The wireless communication system according to claim 1, wherein the information processing apparatus further comprises a reception unit that receives a setting of the connection condition from a user, and the generation unit of the information processing apparatus generates the two-dimensional code in which the information on the received connection condition is recorded.

3. The wireless communication system according to claim 2, wherein the reception unit of the information processing apparatus receives a selection of the connection type of wireless communication or an encryption system as the setting of the connection condition.

4. The wireless communication system according to claim 3, wherein the generation unit of the information processing apparatus generates, when use of the encryption system is selected as the connection condition, a password to be used for encryption processing, and allows the password to be included in the information recorded in the two-dimensional code.

5. The wireless communication system according to claim 1, wherein the connection condition further comprises a setting for selecting which of at least one of standards is used for the information processing apparatus to be connected to the network from among wireless LAN standards of IEEE802.11b, IEEE802.11a, and IEEE802.11g.

6. The wireless communication system according to claim 1, wherein the connection condition further comprises a setting for selecting whether encryption according to the security level is necessary or not, and which one of types of encryption is used for the encryption.

7. A portable terminal comprising:

a wireless communication unit that is connected to a network to perform wireless communication;

a code reading unit that reads a two-dimensional code in which information on a predetermined connection condition for connecting an information processing apparatus to the network in a wireless manner is recorded, the predetermined connection condition comprising a setting necessary to have the information processing apparatus connect to the network by way of the portable terminal functioning as a access point, and the setting comprising at least one of a wireless communication connection type, a security level, and a wireless LAN standard;

an acquisition unit that analyzes the read two-dimensional code to acquire the information on the connection condition; and a communication control unit that builds a function as the access point of the information processing apparatus based on the acquired information on the connection condition, and controls wireless communication between the wireless communication unit and the information processing apparatus, wherein the wireless communication unit is further configured to connect to a first wireless communication unit of the information processing apparatus, the first wireless communication unit is configured to start, after a generation unit of the information processing apparatus generates the two-dimensional code, searching for the access point, and to establish wireless communication with the portable terminal in which the function as the access point is built, and the first wireless communication unit of the information processing apparatus is further configured to, in response to wireless communication with the portable terminal being disconnected, to control the generation unit of the information processing apparatus to generate a new password to be used for encryption processing, and to include a result in the information recorded in the two-dimensional code to generate a new two-dimensional code, to start searching for the access point again, and to establish wireless communication with the portable terminal in which the function as the access point is built.

8. An information processing apparatus comprising:

a generation unit that generates a two-dimensional code in which information on a predetermined connection condition for connection to a network in a wireless manner is recorded, the predetermined connection condition comprising a setting necessary to have the information processing apparatus connect to the network, and the setting comprising at least one of a wireless communication connection type, a security level, and a wireless LAN standard;

a presentation unit that presents the generated two-dimensional code; and a wireless communication unit that connects to the network by way of a portable terminal functioning as an access point according to the connection condition to perform wireless communication, wherein the wireless communication unit starts, after the generation unit of the generates the two-dimensional code, searching for the access point, and establishes wireless communication with the portable terminal in which a function as the access point is built, and the wireless communication unit is configured to, in response to wireless communication with the portable terminal being disconnected, control the generation unit to generate a new password to be used for encryption processing, to include a result in the information recorded in the two-dimensional code to generate a new two-dimensional code, to start searching for the access point again, and to establish wireless communication with the portable terminal in which the function as the access point is built.

9. A non-transitory computer program product comprising a computer readable medium storing instructions adapted to enable a hardware processor of a computer to implement a wireless communication system by performing steps comprising:

reading a two-dimensional code in which information on a predetermined connection condition for connecting an information processing apparatus to a network in a wireless manner is recorded, the predetermined connection condition comprising a setting necessary to have the information processing apparatus connect to the network by way of the portable terminal functioning as an access point, and the setting comprising at least one of a wireless communication type, a security level, and a wireless LAN standard;

analyzing the read two-dimensional code to acquire the information on the connection condition;

building a function as the access point of the information processing apparatus based on the acquired information on the connection condition, performing the connection to the network, and controlling wireless communication with the information processing apparatus; and connecting to a first wireless communication unit of the information processing apparatus, the first wireless communication unit is configured to start, after a generation unit of the information processing apparatus generates the two-dimensional code, searching for the access point, and to establish wireless communication with a portable terminal in which the function as the access point is built, and the first wireless communication unit of the information processing apparatus is further configured to, in response to wireless communication with the portable terminal being disconnected, to control the generation unit of the information processing apparatus to generate a new password to be used for encryption processing, and to include a result in the information recorded in the two-dimensional code to generate a new two-dimensional code, to start searching for the access point again, and to establish wireless communication with the portable terminal in which the function as the access point is built.

10. A non-transitory computer program product comprising a computer readable medium storing instructions adapted to enable a hardware processor of a computer to implement a wireless communication system by performing steps comprising:

generating a two-dimensional code in which information on a predetermined condition for connection to a network in a wireless manner is recorded, the predetermined connection condition comprising a setting necessary to have the information processing apparatus connect to the network, and the setting comprising at least one of a wireless communication type, a security level, and a wireless LAN standard;

presenting the generated two-dimensional code; and connecting to the network by way of a portable terminal functioning as an access point according to the connection condition to perform wireless communication; and connecting to a first wireless communication unit of an information processing apparatus, the first wireless communication unit is configured to start, after a generation unit of the information processing apparatus generates the two-dimensional code, searching for the access point, and to establish wireless communication with a portable terminal in which the function as the access point is built, and the first wireless communication unit of the information processing apparatus is further configured to, in response to wireless communication with the portable terminal being disconnected, to control the generation unit of the information processing apparatus to generate a new password to be used for encryption processing, and to include a result in the information recorded in the two-dimensional code to generate a new two-dimensional code, to start searching for the access point again, and to establish wireless communication with the portable terminal in which the function as the access point is built.

11. A wireless communication method comprising:

generating, by an information processing apparatus, a two-dimensional code in which information on a predetermined connection condition for connection to a network in a wireless manner is recorded, the predetermined connection condition comprising a setting necessary to have the information processing apparatus connect to the network, and the setting comprising at least one of a wireless communication type, a security level, and a wireless LAN standard;

presenting, by the information processing apparatus, the generated two-dimensional code;

reading, by a portable terminal, the two-dimensional code presented by the information processing apparatus;

analyzing, by the portable terminal, the read two-dimensional code to acquire the information on the connection condition;

building, by the portable terminal, a function as an access point of the information processing apparatus based on the acquired information on the connection condition; and connecting, by the information processing apparatus, to the network by way of the portable terminal functioning as the access point to perform wireless communication; and establishing communication between the portable terminal and a first wireless communication unit of the information processing apparatus, the first wireless communication unit is configured to start, after a generation unit of the information processing apparatus generates the two-dimensional code, searching for the access point, and to establish wireless communication with a portable terminal in which the function as the access point is built, and the first wireless communication unit of the information processing apparatus is further configured to, in response to wireless communication with the portable terminal being disconnected, to control the generation unit of the information processing apparatus to generate a new password to be used for encryption processing, and to include a result in the information recorded in the two-dimensional code to generate a new two-dimensional code, to start searching for the access point again, and to establish wireless communication with the portable terminal in which the function as the access point is built.

* * * * *